No. 614,395. Patented Nov. 15, 1898.
R. W. KEILHOLTZ.
EXPANDING TAP.
(Application filed Mar. 22, 1897.)
(No Model.) 3 Sheets—Sheet 1.
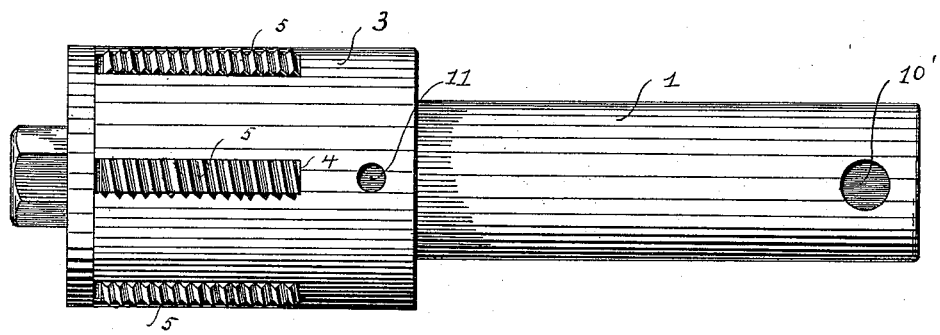
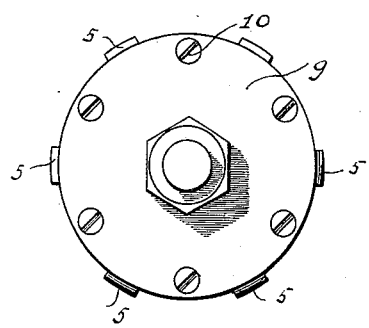
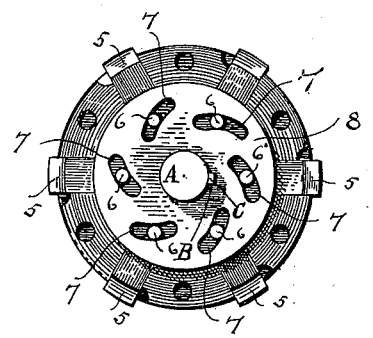
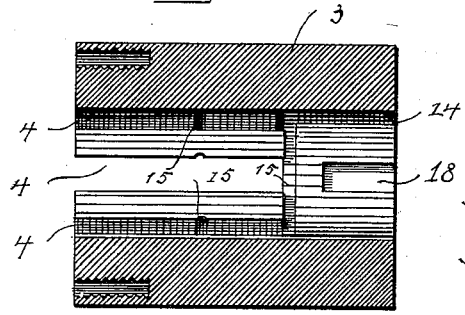
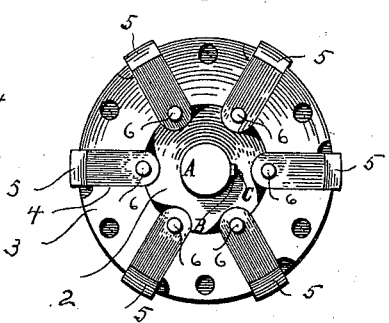
WITNESSES
H. H. Martin
Maud Schumacher
INVENTOR
Richard W. Keilholtz
By William Webster
atty No. 614,395. Patented Nov. 15, 1898.
R. W. KEILHOLTZ.
EXPANDING TAP.
(Application filed Mar. 22, 1897.)
(No Model.) 3 Sheets—Sheet 2.
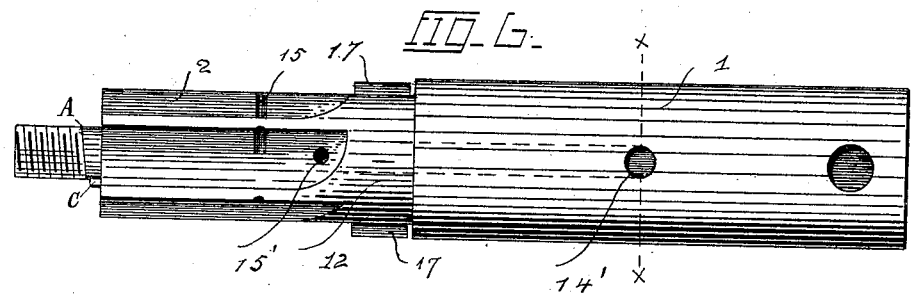
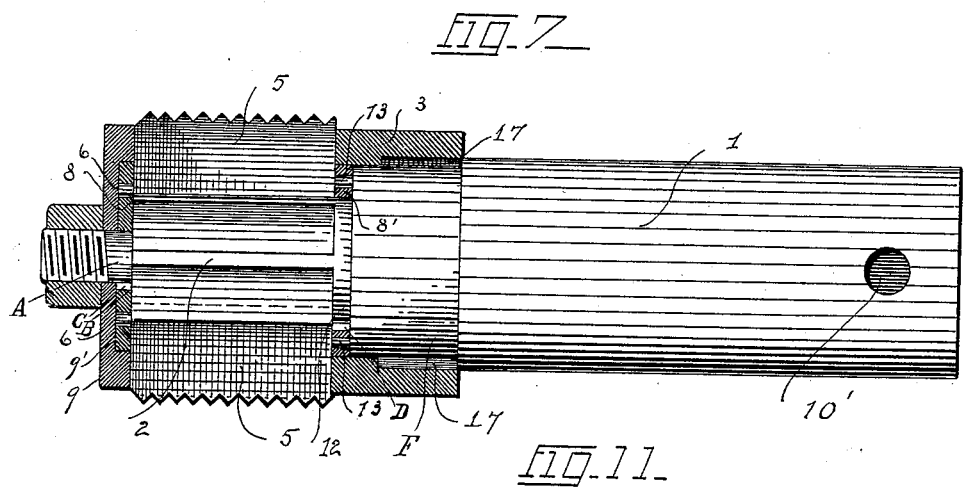
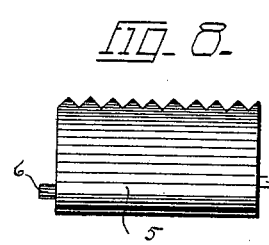
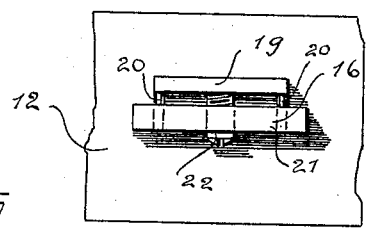
WITNESSES
H. H. Martin
Maud Schumacher
INVENTOR
Richard W Keilholtz
By William Webster
Atty
THE NORRIS PETERS CO., PHOTO-LITHO., WASHINGTON, D. C.

No. 614,395. Patented Nov. 15, 1898.
R. W. KEILHOLTZ.
EXPANDING TAP.
(Application filed Mar. 22, 1897.)
(No Model.) 3 Sheets—Sheet 3.

WITNESSES
Herman H. Martin
Jeanetta Hislop

INVENTOR
Richard W. Keilholtz
By William Webster
atty

UNITED STATES PATENT OFFICE.

RICHARD W. KEILHOLTZ, OF TOLEDO, OHIO.

EXPANDING TAP.

SPECIFICATION forming part of Letters Patent No. 614,395, dated November 15, 1898.

Application filed March 22, 1897. Serial No. 628,619. (No model.)

*To all whom it may concern:*

Be it known that I, RICHARD W. KEILHOLTZ, of Toledo, county of Lucas, and State of Ohio, have invented certain new and useful Improvements in Expanding Taps; and I do hereby declare that the following is a full, clear, and exact description of the invention, which will enable others skilled in the art to which it appertains to make and use the same, reference being had to the accompanying drawings, and to the letters and figures of reference marked thereon, which form part of this specification.

My invention relates to an expanding tap, and has for its object to provide means whereby the dies or chasers may be mechanically advanced or retracted, whereby in tapping the dies or chasers may be advanced to cut a perfect thread and afterward retracted to allow of withdrawing the tap without the necessity of revolving the tap to the pitch of the thread.

A further object is to provide a slotted sleeve concentric to the mandrel to receive dies or chasers of different pitch of thread, with means for advancing or retracting the dies or chasers to a circumference less than the diameter of the hole to be threaded.

A further object is to construct a mandrel with cam-faces contacting with the dies or chasers, whereby a revolution of the mandrel or a revolution of the sleeve upon the mandrel will effect the advancement or retraction of the dies or chasers, with means for regulating the degree of advancement of the dies or chasers. I have also provided novel means for lubricating the dies or chasers while in operation.

Figure 12:
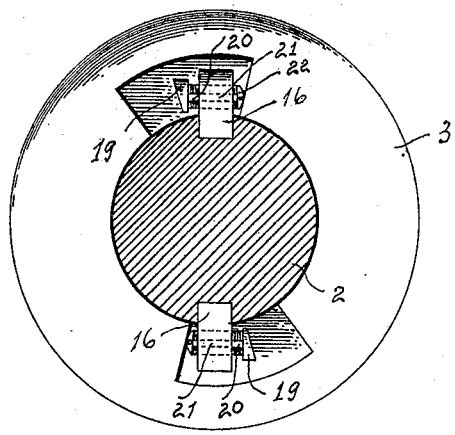
Figure 13:
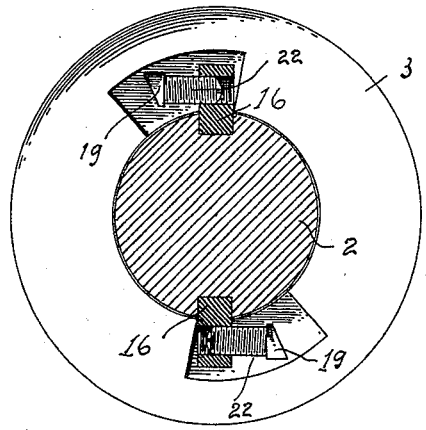

In the drawings, Figure 1 is an elevation of a complete device. Fig. 2 is an end view. Fig. 3 is a plan view of the end plate with the cam-plate in position therein. Fig. 4 is an end view of the sleeve with the face-plate removed, showing the chasers in their relative position with the cam-mandrel. Fig. 5 is a sectional elevation of the sleeve, showing means for lubricating the dies. Fig. 6 is an elevation of the mandrel. Fig. 7 is an elevation showing the sleeve in section to disclose a modified construction in which the cam-plates are employed. Fig. 8 is an elevation of one of the dies or chasers. Fig. 9 is a plan view of the cam-plate employed in the modification shown in Fig. 7. Fig. 10 is a detail view of a key-gage to limit the movement of the mandrel or sleeve, respectively. Fig. 11 is a section through the mandrel on line $x\,x$, Fig. 6, showing an oil-duct in the longitudinal axis of the cam-mandrel. Fig. 12 is a rear end view of the partially rotatory-sleeve, showing the position of the adjustable key-gage shown in Fig. 10 to allow a maximum travel of the chasers. Fig. 13 is a like view showing the key-gage set for the minimum travel of the chasers.

In carrying out my invention I employ a mandrel 1, having a plurality of cam-faces 2, and mount a sleeve 3 upon the mandrel, movable rotatively thereto to a limited extent. Sleeve 3 is slotted, as at 4, to receive, preferably, six chasers 5, the chasers 5 being removably inserted in the sleeve 3, whereby chasers of different threads may be employed. Chasers 5 are formed with pintles 6 upon their outer ends, which engage in cam-slots 7 of a cam-plate 8 for the purpose of retracting the chasers. The cam-plate 8 is mounted upon a reduced portion A of the cam-mandrel 2 and is prevented from rotating thereon by a slot B, formed upon the cam-plate 8 and adapted to engage a key C, let in the periphery of the reduced portion A of the mandrel. Cam-plate 8 is also located within an annular recess 9', formed in the face-plate 9, which is secured to the sleeve by screws 10. The sleeve 3 is also prevented from completely rotating upon the mandrel 2 by a key 17, let in the mandrel and projecting therefrom into a slot or slots 18, formed upon the interior of the sleeve, the slots 18 being of such width as to allow maximum inward and outward travel of the chasers.

In practice, the chasers 5 being inserted in the slots 4 of the sleeve and the mandrel inserted within the sleeve, the revolution of the mandrel will cause the cam-faces 2 to urge the chasers radially outward, thereby expanding the die to the proper degree to cut the thread, and the pintles 6 being within the cam-slots 7 of the cam-plate 8 a reverse movement will retract the chasers to a circumference coincident with the circumferences of the sleeve and allow withdrawal of the tap without the usual tedious necessity of running the tap out by the thread. I wish it understood that I may make the body of the mandrel either round or square to suit the different chucks.

When it is desired to project the chasers, should the body of the mandrel be round, a tool is inserted into the orifice 10' to hold the mandrel from revolution, and a drift-pin is inserted into the orifice 11, by which means the sleeve is revolved, causing the chasers to ride up the cam-faces 2 of the mandrel, and the operation is reversed should it be desired to retract the chasers for the withdrawal of the tool.

In the modification shown in Fig. 7 I employ two cam-plates 8 and 8', the inner cam-plate 8' being mounted upon the circular portion 12 of the mandrel 1, and I employ an inner pintle 13 upon the chaser 5. Cam-plate 8' is also prevented from rotating upon the cam-mandrel by a key D, let in the periphery of the mandrel and engaging a coincident slot E, formed in the inner periphery of the cam-plate 9. The operation is the same in this instance as heretofore described, the only advantage being that by reason of the two cam-plates and pintles the movement of the chasers in their retraction is without the possibility of torsion caused by adhesion to the rear portion of the die, rendering it more positive.

By reference to Fig. 5 it will be seen that I have provided for lubrication of the chasers through the medium of a central duct 14 in the sleeve and transverse ducts 15, feeding to the slots and consequently the cutting edges of chasers, or I may bore out the central section of the cam-mandrel for an oil-duct, with an orifice 14' at right angles thereto, terminating on the periphery of the mandrel, whereby connection can be made with an oil-reservoir elevated above the machine, the cam portion of the mandrel 1 being tapped at 15', feeding the different ducts 15.

For controlling the travel of the chasers 5 I have provided an adjustable key-gage. (Illustrated in Figs. 10, 12, and 13.) One or more of the adjustable key-gages may be secured upon the step F (shown in Fig. 7) or the circular portion 12, Fig. 6, upon the mandrel 1, parallel with the longitudinal axis thereof and in identical position indicated by the solid keys 17 shown in the drawings. The gage comprises a key 16, which is let into the mandrel and is secured upon the periphery of the mandrel and is centrally perforated and screw-threaded to receive a screw 22, the revolution of which will force outwardly a gage-bar 19 parallel with the key 16, and which is supported and held in parallel alinement with the gage 16 by the plurality of arms 20 passing through coincident perforations 21, through the key 16.

The operation of the key-gage is fully illustrated in Figs. 12 and 13, Fig. 12 showing the gage-bar 19 in close proximity to the key 16, and thereby allowing a maximum travel of the chasers by the increased rotatory movement of the sleeve, and Fig. 13 shows the key-gage extended to the limit for the minimum rotation of the sleeve and consequent travel of the chasers.

I preferably employ two gage-keys, which are located upon diametrically opposite sides of the mandrel 2.

What I claim is—

1. In an expanding tap, a mandrel provided with longitudinal cam-faces, a sleeve upon the mandrel adapted to have a limited rotation thereon, slots formed in the sleeve commencing upon one end and leaving sufficient metal upon the opposite end to secure the sections formed by slotting-chasers inserted in the sleeve, adapted to contact with the cam-faces of the mandrel, a reduced or step portion formed upon the mandrel, upon which is mounted a plate having formed therein cam-slots concentric to the cam-faces formed upon the mandrel, a keyway secured to the reduced portion, or step of the mandrel whereby the cam-plate is prevented from rotating, pintles integral with the chasers, and projecting into the slots formed upon the cam-plate, a face-plate inserted upon the reduced portion of the mandrel, and having formed therein a recess adapted to receive the cam-plate slotted in concentric relation to the cam-faces of the mandrel, means for securing the face-plate to the sleeve, and upon the mandrel a shoulder, or step formed to prevent the backward movement of the sleeve mounted thereon.

2. In an expanding tap, a mandrel having a plurality of cam-surfaces formed thereon, a sleeve mounted upon the mandrel over the cam-surfaces and projecting inwardly and beyond said cam-surfaces and having longitudinal slots in coincidence with the cam-surfaces, adapted to receive chasers having projecting pintles integral therewith adapted to engage coincident cam-slots formed upon a plate adapted to be secured to the mandrel, a face-plate adapted to secure the outer cam-plate to the sleeve, slots formed upon the internal periphery of the sleeve, keys secured to the mandrel in parallel alinement with the slots, the keys being centrally perforated and screw-threaded to receive an adjustable screw adapted to move outwardly, or limit the inward travel of the bar held in parallel alinement with the keys secured to the mandrel, whereby the rotative movement of the sleeve is adjustable to the desired outward travel of the chasers located in the longitudinal slots formed in the sleeve, and a central perforation passing through the longitudinal axis of the mandrel for supplying a lubricating medium to the chasers.

In testimony that I claim the foregoing as my own I hereby affix my signature in presence of two witnesses.

RICHARD W. KEILHOLTZ.

Witnesses:
 WILLIAM WEBSTER,
 MAUD SCHUMACHER.